(12) United States Patent
Paige et al.

(10) Patent No.: US 9,410,437 B2
(45) Date of Patent: Aug. 9, 2016

(54) AIRFOIL COMPONENTS CONTAINING CERAMIC-BASED MATERIALS AND PROCESSES THEREFOR

(71) Applicant: General Electric Company, Schenectady, NY (US)

(72) Inventors: Anthony Reid Paige, Jupiter, FL (US); Mark Eugene Noe, Morrow, OH (US); Michael James Verrilli, Loveland, OH (US); Mark Willard Marusko, Springboro, OH (US); Joshua Brian Jamison, Liberty Township, OH (US); Paul Izon, Morrow, OH (US)

(73) Assignee: General Electric Company, Schenectady, NY (US)

( * ) Notice: Subject to any disclaimer, the term of this patent is extended or adjusted under 35 U.S.C. 154(b) by 152 days.

(21) Appl. No.: 13/721,349

(22) Filed: Dec. 20, 2012

(65) Prior Publication Data
US 2014/0050893 A1 Feb. 20, 2014

Related U.S. Application Data

(60) Provisional application No. 61/682,870, filed on Aug. 14, 2012.

(51) Int. Cl.
*F01D 5/18* (2006.01)
*F01D 5/28* (2006.01)
*F01D 5/20* (2006.01)

(52) U.S. Cl.
CPC .. *F01D 5/28* (2013.01); *F01D 5/20* (2013.01); *F01D 5/284* (2013.01); *F01D 5/187* (2013.01);
(Continued)

(58) Field of Classification Search
CPC .............. F01D 5/18; F01D 5/20; F01D 5/284
See application file for complete search history.

(56) References Cited

U.S. PATENT DOCUMENTS

| 5,015,540 A | 5/1991 | Borom et al. |
| 5,330,854 A | 7/1994 | Singh et al. |

(Continued)

FOREIGN PATENT DOCUMENTS

| CN | 1926250 A | 3/2007 |
| CN | 101131099 A | 2/2008 |

(Continued)

OTHER PUBLICATIONS

PCT Search Report and Written Opinion issued May 12, 2014 in connection with corresponding PCT Patent Application No. PCT/US2013/050847.

(Continued)

*Primary Examiner* — Scott W Dodds
(74) *Attorney, Agent, or Firm* — General Electric Company; Brian P. Overbeck

(57) ABSTRACT

A process for producing airfoil components containing ceramic-based materials and having a tip cap. The process entails forming an airfoil portion of the component from an airfoil portion material that contains a precursor of a ceramic-based material. The airfoil portion material defines concave and convex walls of the airfoil portion, and the concave and convex walls define a tip region of the airfoil portion and at least one cavity within the airfoil portion. At least a first ply is formed that contains a precursor of a ceramic-based material, and the first ply at least partially closes the cavity at the tip region of the airfoil portion. The airfoil portion material and the first ply are then cured so that the first ply forms a tip cap that closes the cavity and the precursors of the airfoil portion material and first ply are converted to the ceramic-based materials thereof.

20 Claims, 5 Drawing Sheets

(52) U.S. Cl.
CPC .......... *F01D 5/282* (2013.01); *F05D 2240/125* (2013.01); *F05D 2240/307* (2013.01); *Y02T 50/672* (2013.01); *Y02T 50/673* (2013.01); *Y10T 428/24496* (2015.01)

(56) References Cited

U.S. PATENT DOCUMENTS

| | | | |
|---|---|---|---|
| 5,336,350 | A | 8/1994 | Singh |
| 5,488,017 | A | 1/1996 | Szweda et al. |
| 5,628,938 | A | 5/1997 | Sangeeta et al. |
| 6,024,898 | A | 2/2000 | Steibel et al. |
| 6,258,737 | B1 | 7/2001 | Steibel et al. |
| 6,403,158 | B1 | 6/2002 | Corman |
| 6,503,441 | B2 | 1/2003 | Corman et al. |
| 7,153,096 | B2 | 12/2006 | Thompson et al. |
| 7,510,379 | B2 | 3/2009 | Marusko et al. |
| 7,703,312 | B2 | 4/2010 | David |
| 8,075,279 | B2 | 12/2011 | Ahmad et al. |
| 2004/0067316 | A1 | 4/2004 | Gray et al. |
| 2005/0238491 | A1 | 10/2005 | Morrison et al. |
| 2007/0140835 | A1 | 6/2007 | Albrecht et al. |
| 2011/0052406 | A1 | 3/2011 | Bruce et al. |
| 2012/0163978 | A1 | 6/2012 | Darkins, Jr. et al. |

FOREIGN PATENT DOCUMENTS

| | | |
|---|---|---|
| EP | 1367223 A2 | 12/2003 |
| EP | 1826362 A2 | 8/2007 |
| GB | 2147055 A | 5/1985 |

OTHER PUBLICATIONS

Unofficial English translation of Chinese Office Action issued in connection with corresponding CN Application No. 201380043231.4 on Aug. 4, 2015.

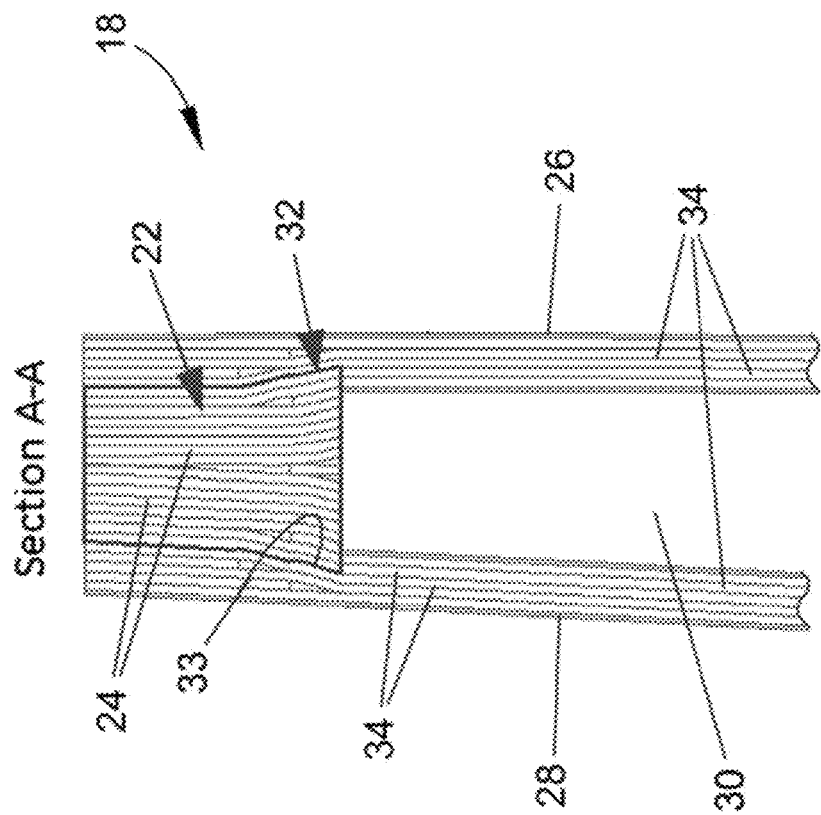
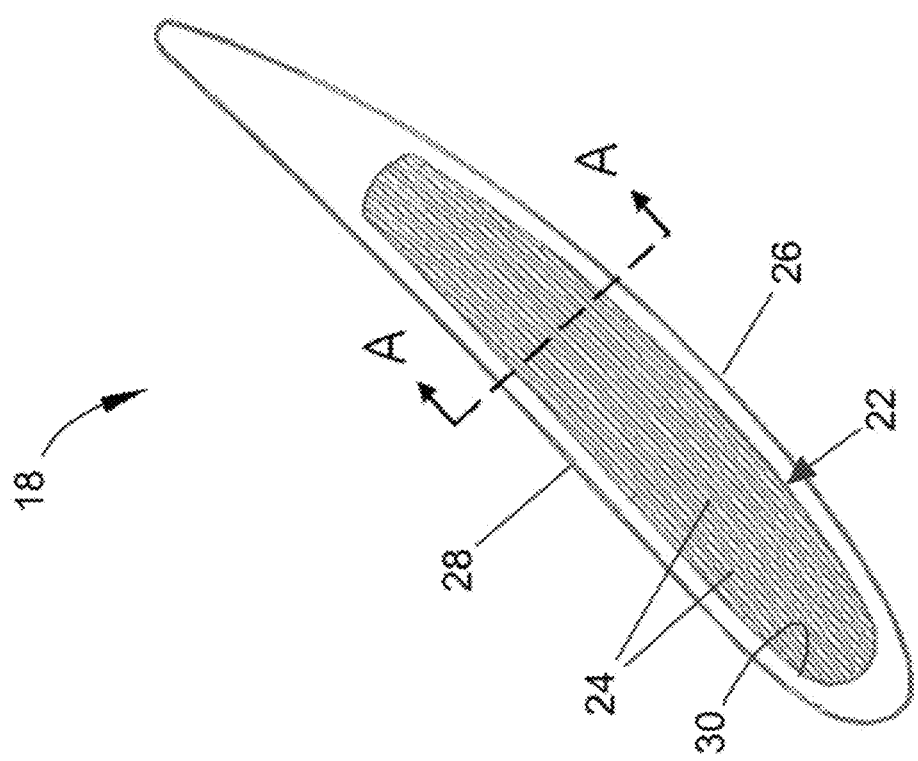

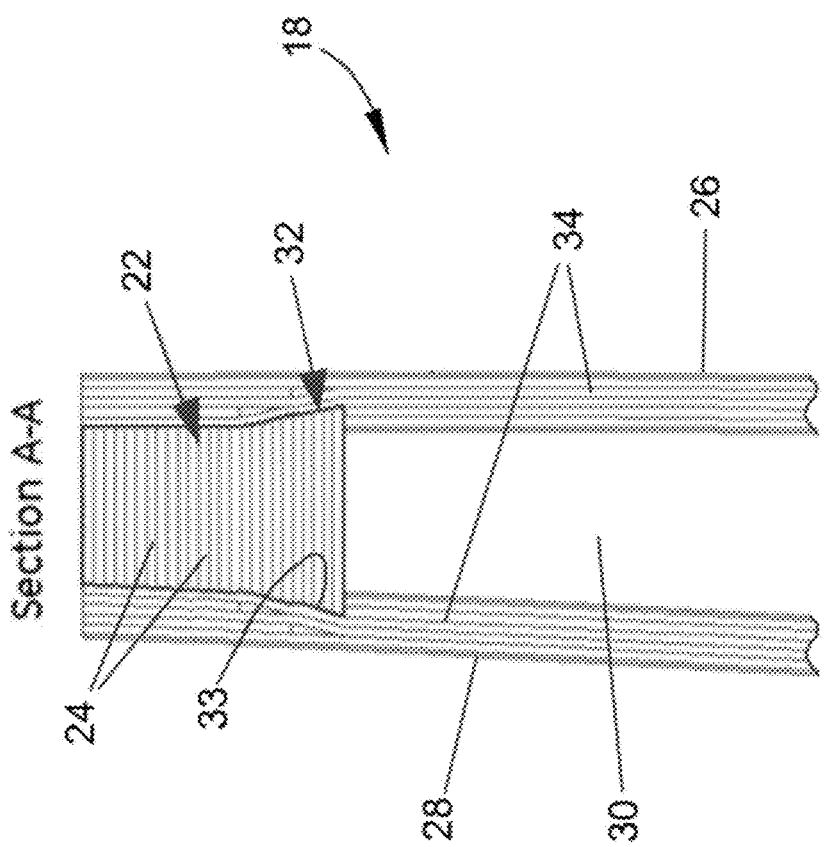
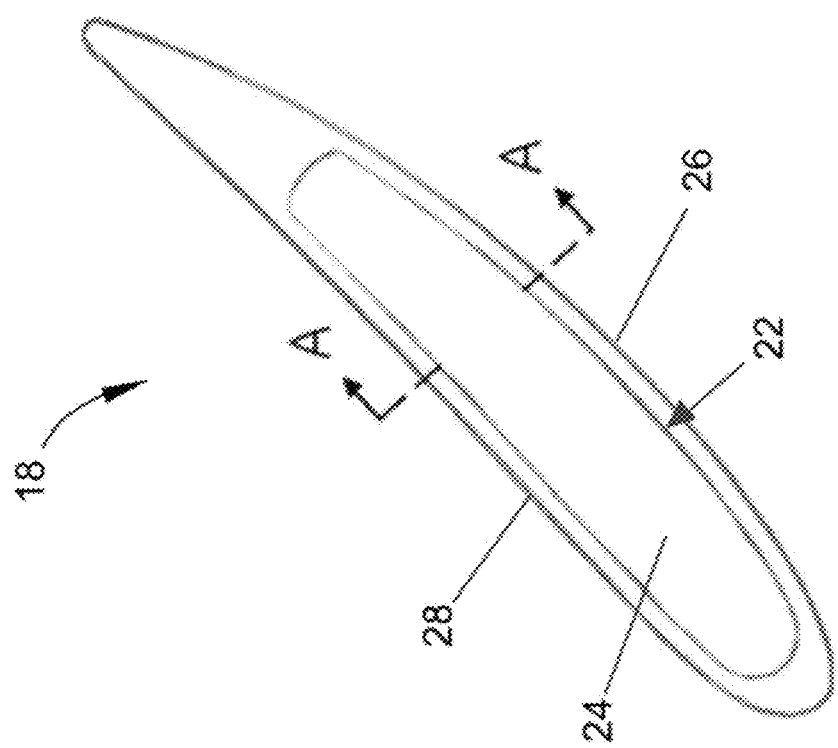
FIG. 3B
FIG. 3A

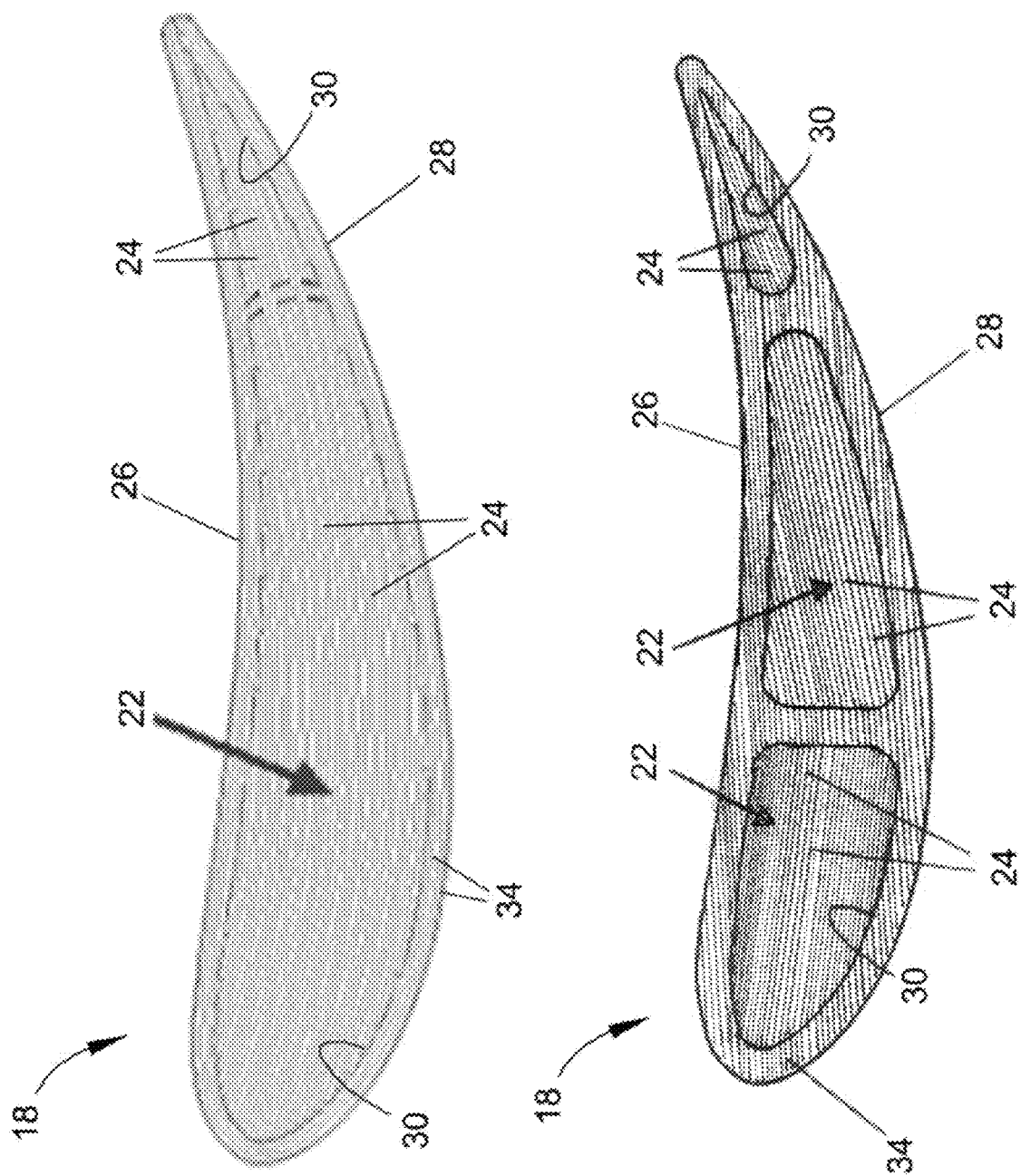

AIRFOIL COMPONENTS CONTAINING CERAMIC-BASED MATERIALS AND PROCESSES THEREFOR

CROSS REFERENCE TO RELATED APPLICATIONS

This application claims the benefit of U.S. Provisional Application No. 61/682,870, filed Aug. 14, 2012, the contents of which are incorporated herein by reference.

BACKGROUND OF THE INVENTION

The present invention generally relates to processes for producing airfoil components of turbomachinery and airfoil components produced thereby. More particularly, this invention is directed to processes for producing ceramic-based airfoil components with tip caps, and airfoil components produced thereby.

Components of turbomachinery, including blades (buckets) and vanes (nozzles) of gas turbines, are typically formed of nickel-, cobalt- or iron-base superalloys with desirable mechanical and environmental properties for turbine operating temperatures and conditions. Because the efficiency of a gas turbine is dependent on its operating temperatures, there is a demand for components that are capable of withstanding increasingly higher temperatures. As the maximum local temperature of a component approaches the melting temperature of its alloy, forced air cooling becomes necessary. For this reason, airfoils of gas turbines, and in particular their low pressure and high pressure turbine (LPT and HPT) blades, often require complex cooling schemes in which air is forced through internal cooling passages within the airfoil and then discharged through cooling holes at the airfoil surface. Airfoil components can be equipped with tip caps that regulate internal cavity pressure, allowing for proper air flow through the cooling passages and holes. Tip caps are typically cast, brazed or welded onto metallic air-cooled LPT and HPT blades.

As higher operating temperatures for gas turbines are continuously sought in order to increase their efficiency, alternative materials have been investigated. Ceramic-based materials are a notable example because their high temperature capabilities significantly reduce cooling air requirements. As used herein, ceramic-based materials encompass homogeneous (monolithic) ceramic materials as well as ceramic matrix composite (CMC) materials. CMC materials generally comprise a ceramic fiber reinforcement material embedded in a ceramic matrix material. The reinforcement material may be discontinuous short fibers that are randomly dispersed in the matrix material or continuous fibers or fiber bundles oriented within the matrix material. The reinforcement material serves as the load-bearing constituent of the CMC in the event of a matrix crack. In turn, the ceramic matrix protects the reinforcement material, maintains the orientation of its fibers, and serves to dissipate loads to the reinforcement material. Silicon-based composites, such as silicon carbide (SiC) as the matrix and/or reinforcement material, have become of particular interest to high-temperature components of gas turbines, including aircraft gas turbine engines and land-based gas turbine engines used in the power-generating industry. SiC fibers have also been used as a reinforcement material for a variety of other ceramic matrix materials, including TiC, $Si_3N_4$, and $Al_2O_3$. Continuous fiber reinforced ceramic composites (CFCC) are a particular type of CMC that offers light weight, high strength, and high stiffness for a variety of high temperature load-bearing applications, including shrouds, combustor liners, vanes (nozzles), blades (buckets), and other high-temperature components of gas turbines. A notable example of a CFCC material developed by the General Electric Company under the name HiPerComp® contains continuous silicon carbide fibers in a matrix of silicon carbide and elemental silicon or a silicon alloy.

Various techniques may be employed in the fabrication of CMC components, including chemical vapor infiltration (CVI) and melt infiltration (MI). These fabrication techniques have been used in combination with tooling or dies to produce near-net-shape articles through processes that include the application of heat and chemical processes at various processing stages. Examples of such processes, particularly for SiC/Si—SiC (fiber/matrix) CFCC materials, are disclosed in U.S. Pat. Nos. 5,015,540, 5,330,854, 5,336,350, 5,628,938, 6,024,898, 6,258,737, 6,403,158, and 6,503,441, and U.S. Patent Application Publication No. 2004/0067316. One such process entails the fabrication of CMCs from prepregs, each in the form of a tape-like structure comprising the desired reinforcement material, a precursor of the CMC matrix material, and one or more binders. After partially drying and, if appropriate, partially curing the binders (B-staging), the resulting tape is laid-up with other tapes, debulked and, if appropriate, cured while subjected to elevated pressures and temperatures to produce a cured preform. The preform is then fired (pyrolized) in a vacuum or inert atmosphere to remove solvents, decompose the binders, and convert the precursor to the desired ceramic matrix material, yielding a porous preform that is ready for melt infiltration. During melt infiltration, molten silicon and/or a silicon alloy is typically infiltrated into the porosity of the preform, where it fills the porosity and may react with carbon to form additional silicon carbide.

For purposes of discussion, a low pressure turbine (LPT) blade 10 of a gas turbine engine is represented in FIG. 1. The blade 10 is an example of a component that can be produced from ceramic-based materials, including CMC materials. The blade 10 is generally represented as being of a known type and adapted for mounting to a disk or rotor (not shown) within the turbine section of an aircraft gas turbine engine. For this reason, the blade 10 is represented as including a dovetail 12 for anchoring the blade 10 to a turbine disk by interlocking with a complementary dovetail slot formed in the circumference of the disk. As represented in FIG. 1, the interlocking features comprise one or more protrusions 14 that engage recesses defined by the dovetail slot. The blade 10 is further shown as having a platform 16 that separates an airfoil 18 from a shank 20 on which the dovetail 12 is defined.

Current state-of-the-art approaches for fabricating ceramic-based turbine blades have involved integrating the dovetail 12, platform 16, and airfoil 18 as one piece during the manufacturing process, much like conventional investment casting techniques currently used to make metallic blades. Because of their relatively higher temperature capability, CMC airfoils such as the blade 10 have not been equipped with tip caps for the purpose described above for metallic airfoil components. Moreover, brazing and welding techniques used to attach tip caps to metallic air-cooled LPT and HPT blades processes are not generally practical for attaching tip caps to airfoil components formed of CMC materials. In addition, tip caps define a geometric feature that is oriented transverse to the span-wise direction of the blade 10, such that the incorporation of a tip cap into a CMC blade would pose design and manufacturing challenges. Furthermore, the low strain-to-failure capabilities of typical CMC materials pose additional challenges to implementing tip caps in rotating CMC airfoil components such as turbine blades, where a tip cap would be subjected to high centrifugal forces.

BRIEF DESCRIPTION OF THE INVENTION

The present invention provides a process for producing airfoil components containing ceramic-based materials, in which a tip cap formed of a ceramic-based material is incorporated to yield a component that may further incorporate air cooling cavities and cooling holes to provide an air cooling capability.

According to a first aspect of the invention, a process is provided that entails forming an airfoil portion of an airfoil component from an airfoil portion material that contains a precursor of a ceramic-based material. The airfoil portion material defines concave and convex walls of the airfoil portion, and the concave and convex walls define a tip region of the airfoil portion and at least a first cavity within the airfoil portion. At least a first ply is formed that contains a precursor of a ceramic-based material, and the first ply at least partially closes the first cavity at the tip region of the airfoil portion. The airfoil portion material of the airfoil portion and the first ply are then cured so that the first ply forms a tip cap that closes the first cavity at the tip region and the precursors of the airfoil portion material and first ply are converted to the ceramic-based materials thereof.

According to a preferred aspect of the invention, an airfoil component produced by the process described above may be, as a nonlimiting example, a turbine blade of a turbomachine.

A technical effect of this invention is the ability to produce CMC airfoil components having tip caps suitable for use in combination with internal air cooling schemes, wherein the tip caps are capable of exhibiting strength and effective load transfer for inclusion on rotating airfoil components, including turbine blades.

Other aspects and advantages of this invention will be better appreciated from the following detailed description.

BRIEF DESCRIPTION OF THE DRAWINGS

FIGS. 2A and 2B schematically represent, respectively, and end view and a span-wise cross-sectional view of the tip region of a turbine blade (such as that of FIG. 1), and represents the integration of a tip cap from prepreg plies in accordance with an embodiment of the present invention.

FIGS. 3A and 3B schematically represent, respectively, and end view and a span-wise cross-sectional view of the tip region of a turbine blade (such as that of FIG. 1), and represents the integration of a tip cap from prepreg plies in accordance with another embodiment of the present invention.

FIG. 4 schematically represents a chord-wise cross-sectional view of the tip region of a turbine blade (such as that of FIG. 1), and represents the integration of a tip cap that closes multiple cavities within the blade in accordance with an embodiment of the invention.

FIG. 5 schematically represents a chord-wise cross-sectional view of the tip region of a turbine blade (such as that of FIG. 1), and represents the integration of multiple tip caps each individually closing a cavity within the blade in accordance with an embodiment of the invention.

DETAILED DESCRIPTION OF THE INVENTION

The present invention will be described in terms of processes for producing components that contain ceramic-based materials, and particularly the incorporation of one or more tip caps that can be used to close one or more internal cavities of a component formed of a ceramic-based material, preferably a CMC material. While various applications are foreseeable and possible, applications of particular interest include high temperature applications, for example, turbine components of gas turbines, including land-based and aircraft gas turbine engines. The CMC turbine blade 10 of FIG. 1 will serve as an example in the following discussion. While the invention is applicable to a wide variety of ceramic-based materials, ceramic-based materials of particular interest to the invention are believed to be CMC materials containing silicon, such as CMC's containing silicon carbide as the reinforcement and/or matrix material, for example, continuous silicon carbide fibers in a matrix of silicon carbide. However, other ceramic-based materials are also within the scope of the invention, nonlimiting examples of which include fibers and reinforcement materials formed of titanium carbide (TiC), silicon nitride ($Si_3N_4$), and/or alumina ($Al_2O_3$).

As known in the art, the airfoil 18 of the blade 10 is an excellent candidate for being produced from a ceramic-based material, and especially a CMC material, because it is directly exposed to the hot combustion gases within the turbine section of a turbomachine, and has a generally linear geometry. On the other hand, the incorporation of an internal cooling cavity, cooling holes and a tip cap results in a more complex geometry, in the sense that the airfoil 18 has a generally linear geometry along its dominant span-wise axis, whereas a tip cap would be a geometric feature oriented transverse to the span-wise direction of the blade 10. Furthermore, the off-axis geometry of a tip cap would be subjected to high mechanical loading during operation of the engine, and therefore require structural interface capabilities that pose substantial challenges to designing, manufacturing and integration with a blade formed of a CMC material. The present invention provides a process for taking advantage of the high-temperature capabilities of CMC materials, while addressing the difficulties of integrating a tip cap into an airfoil component formed of a CMC material. In particular, a preferred aspect of the present invention is the ability to produce a tip cap from plies, and to fully integrate the tip cap as part of an airfoil formed from plies utilizing a lay-up process.

Figure 1:
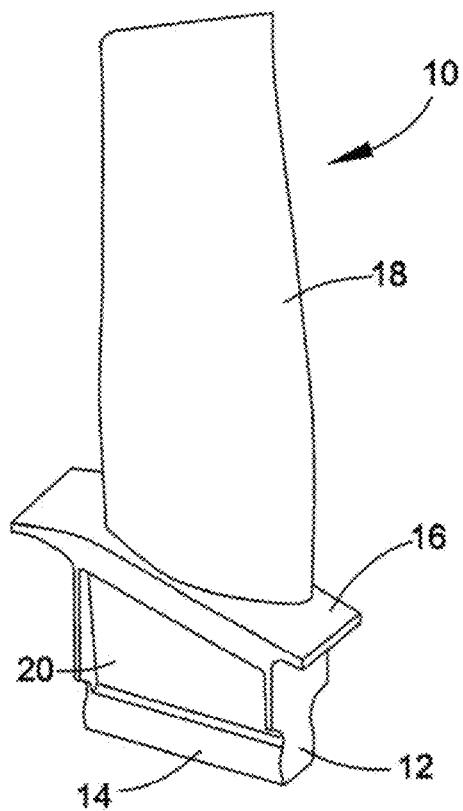
FIG. 1 is a perspective view schematically representing a turbine blade of a type that can be formed of a CMC material in accordance with embodiments of the present invention.

FIGS. 2A, 2B, 3A, 3B, and 4-7 schematically represent views of the tip region of the blade 10 of FIG. 1, and represent the integration of tip caps 22 from plies 24 in accordance with various non-limiting embodiments of the present invention. The airfoil 18 and tip cap 22 can be fabricated from ceramic-based materials produced using known processes, for example, with the use of prepregs. As a particular example, the airfoil 18 and its cap 22 can each be fabricated using a prepreg melt-infiltration (MI) process of a type previously described, wherein multiple prepregs are formed to contain one or more desired reinforcement materials and a precursor of the CMC matrix material, as well as one or more binders. The prepregs undergo lay-up, are debulked and cured while subjected to elevated pressures and temperatures, and may undergo various other processing steps to form a laminate preform. Thereafter, the laminate preform is heated (fired) in a vacuum or an inert atmosphere to decompose the binders and produce a porous preform, which then preferably undergoes melt infiltration. If the CMC material comprises a silicon carbide reinforcement material in a ceramic matrix of silicon carbide (a SiC/SiC CMC material), molten silicon or a silicon alloy is typically used to infiltrate and fill the porosity and, in preferred embodiments, react with a carbon constituent (carbon, carbon source, or carbon char) within the matrix to form silicon carbide. However, it will be apparent from the following discussion that the invention also applies to other types and combinations of ceramic and CMC materials. Furthermore, it is foreseeable that the unitary airfoil 18 and cap 22 could be fabricated with the use of materials other than prepregs, for example, cloth-reinforced CMCs, such as chemical vapor infiltrated (CVI) SiC reinforced with carbon fiber cloth (C/SiC), CVI/slurry cast/melt infiltrated SiC/SiC, and CVI SiC reinforced with SiC cloth. Polymer infiltration and pyrolysis (PIP) processes can also be used to deposit the matrix into a cloth reinforced preform, in which case a SiC or carbon cloth can be used.

According to a preferred aspect of the invention, the fabrication of the tip cap 22 entails steps intended to fully integrate the tip cap 22 into the linear geometry of the airfoil 18. FIGS. 2A and 2B represent an example of a blade tip region of the blade airfoil 18 during the fabrication of the tip cap 22, which according to a preferred aspect of the invention can be entirely formed of a CMC material and produced by a CMC process as described above. As represented in FIGS. 2A and 2B, the tip cap 22 is fabricated from multiple prepreg plies 24. FIGS. 2A and 2B represent the plies 24 as disposed within a cavity 30 defined by and between the convex (suction) and concave (pressure) walls 26 and 28 of the airfoil 18, which as represented in FIG. 2B are also fabricated from multiple plies 34. FIGS. 2A and 2B further represent the plies 24 as extending in the chord-wise direction of the airfoil 18. As previously noted, each of the plies 24 and 34 preferably contains a desired reinforcement material and a suitable precursor of a desired ceramic matrix material. The reinforcement material and ceramic matrix material of the tip cap plies 24 are preferably, though not necessarily, the same as those for the airfoil plies 34.

It should be appreciated that various numbers of plies 24 could be incorporated into the construction of the tip cap 22 of the blade 10. To build up a suitable thickness for the tip cap 22 that completely fills the portion of the cavity 30 within the blade tip region of the airfoil 18, most of the plies 24 are represented as having roughly equal chord-wise lengths (FIG. 2A). In addition, most of the plies 24 are represented as having roughly equal span-wise lengths (FIG. 2B), such that the tip cap 22 is substantially flush with the end of each wall 26 and 28 of the airfoil 18. However, certain plies 24 are represented as being intentionally shorter than others in the chord-wise direction (FIG. 2A) to accommodate a varying width of the cavity 30, and certain plies 24 are also represented as being intentionally shorter than others in the span-wise direction (FIG. 2B). It should be understood that the lengths and widths of the plies 24 can vary, for example, as a result of increasing or decreasing in length and/or width to yield what may be referred to as a stepped formation. Accordingly, shapes and sizes of the plies 24 other than the particular shapes and sizes represented in FIG. 2 are foreseeable and within the scope of the invention.

According to a preferred aspect of the invention, shorter plies 24 in the span-wise direction are utilized to create a wedge-shaped profile 32 at the radially-inward end of the tip cap 22. As seen in FIG. 2B, the wedge-shaped profile 32 of the cap 22 engages complementary notches 33 formed in the interior surfaces of the convex and concave walls 26 and 28 of the airfoil 18. The wedge-shaped profile 32 of the tip cap 22 and the notch 33 within the airfoil cavity 30 cooperate to interlock the tip cap 22 within the cavity 30, particularly after the plies 24 of the tip cap 22 are fired and melt infiltrated, enabling the tip cap 22 to withstand high centrifugal forces that exist during the operation of the blade 10.

To complete the manufacturing of the blade 10 and its tip cap 22, the laid-up prepreg plies 24 and 34 are preferably debulked prior to undergoing curing, followed by firing during which binders are burned-off and a ceramic precursor is converted to the desired ceramic matrix material for the reinforcement material. Suitable debulking, curing and firing processes, as well as any additional processes necessary to achieve the final desired shape and properties of the blade 10, are known in the art and therefore will not be described further.

Whereas the plies 24 of the tip cap 22 are represented in FIGS. 2A and 2B as being oriented in the span-wise and chord-wise directions of the airfoil 18, FIGS. 3A and 3B represent another embodiment in which the plies 24 are oriented in the thickness-wise and chord-wise directions of the airfoil 18. Aside from the difference in orientation of the plies 24, the tip cap 22 can be fabricated and interlocked with the airfoil 18 in essentially the same manner as described for the embodiment of FIGS. 2A and 2B.

Figure 6:
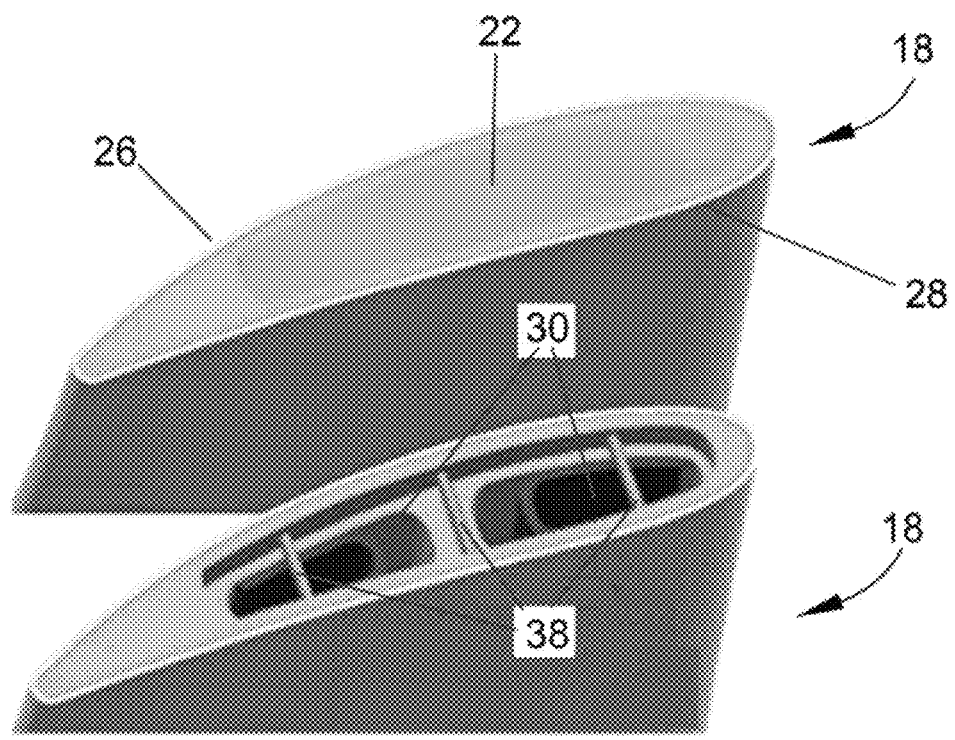
FIG. 6 shows two perspective views of the tip region of a turbine blade (such as that of FIG. 1), and represents the integration of a reinforced tip cap in accordance with another embodiment of the invention.

FIGS. 4 through 7 represent additional configurations for tip caps 22 that can be fabricated in accordance with various aspects of the invention. Whereas in FIGS. 2A, 2B, 3A and 3B, a single tip cap 22 is represented as filling a single cavity 30 in an airfoil 18, FIG. 4 represents a single tip cap 22 as closing multiple cavities (cooling passages) 30 within an airfoil 18, FIG. 5 represents separate tip caps 22 as individually filling and closing each of multiple cavities (cooling passages) 30 within an airfoil 18, and FIG. 6 represents the incorporation of pins 38 to help secure a tip cap 22 used to close multiple cavities (cooling passages) 30 within an airfoil 18. In the embodiment of FIG. 4, the tip cap 22 is fabricated on top of all blade cavities 30 to seal off cooling passage air flow at the blade tip. Plies 34 of the airfoil walls 26 and 28 are represented in FIG. 4 as wrapped around the cooling cavities 30 and the plies 24 of the tip cap 22, and the tip cap 22 is bonded to the interior surfaces of the airfoil walls 26 and 28 during curing of both the airfoil 18 and tip cap 22. In FIG. 5, each cooling cavity 30 is individually sealed off by a separate tip cap 24.

The reinforced embodiment of FIG. 6 is intended to increase the aerodynamic and centrifugal loading capability of the tip cap 22. In FIG. 6, a single tip cap 22 (shown in the upper blade tip of FIG. 6, but omitted in the lower image to reveal the cavities 30 and pins 38) is represented as closing multiple cavities (cooling passages) 30 within an airfoil 18, though it should be understood that separate tip caps 22 that individually fill and close multiple cavities 30 could also be reinforced in the same or similar manner. The embodiment represented in FIG. 6 entails additional steps between the lamination and cure processes. In a particular example, holes (not shown) are drilled through the airfoil walls 26 and 28 and tip cap 22, for example, using an ultrasonic needling process, and then the pins 38, for example, formed of prepregs, are inserted into the holes to create an interlocking connection between the airfoil walls 26 and 28 and tip cap 22 following curing.

Figure 7:
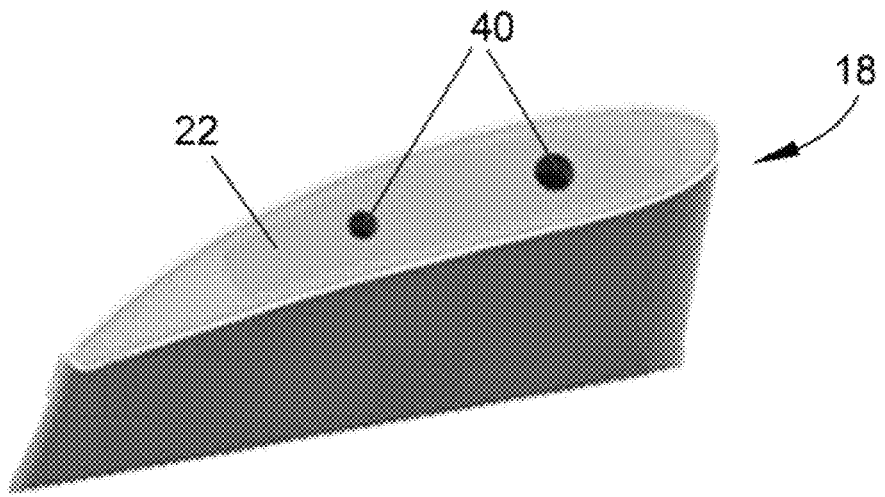
FIG. 7 is a perspective view of the tip region of a turbine blade (such as that of FIG. 1), and represents the integration of holes in a tip cap constructed in accordance with embodiments of the invention.

Finally, FIG. 7 represents the incorporation of holes 40 in the tip cap 22 that are fluidically connected to one or more cavities (not shown) within the airfoil 18. As known in the art of blades formed of metallic materials, tip cap purge holes have been utilized to regulate internal cavity pressures within blades, which in turn determines the cooling air flow rates through the cooling passages and cooling holes of the blades. Holes 40 of the type represented in FIG. 7 can be formed by drilling after melt infiltration, when the CMC plies 24 of the tip cap 22 have been fully processed. Drilling techniques that can be used include electrodischarge machining (EDM), ultrasonic machining, or another traditional machining technique.

While the invention has been described in terms of specific embodiments, it is apparent that other forms could be adopted by one skilled in the art. For example, the number of tip cap plies 24 required to close a particular cavity 30 of a blade 10 can be modified, for example, by increasing the thickness of either or both airfoil walls 26 and 28. Furthermore, the composition of the tip cap 22 can vary from that described above, for example, discontinuous (chopped) fiber reinforcement materials could be used in place of continuous fiber reinforcement materials, and in doing so could potentially eliminate the need for multiple laminated plies 24 to form the tip cap 22. In addition, welding or fusing techniques could be adapted to bond the tip cap 22 to the airfoil 18 after melt infiltration, avoiding the process of forming the tip cap 22 as part of the initial composite laminate. Therefore, the scope of the invention is to be limited only by the following claims.

The invention claimed is:

1. A process for producing an airfoil component, the process comprising:
   forming an airfoil portion of an airfoil portion material containing a precursor of a ceramic based material, the airfoil portion material defining concave and convex walls of the airfoil portion, the concave and convex walls defining a tip region of the airfoil portion and at least a first cavity within the airfoil portion;
   forming at least a first ply that contains a precursor of a ceramic based material, the at least first ply at least partially closing the first cavity at the tip region of the airfoil portion, the at least first ply defining a wedge-shaped profile;
   inserting the at least first ply in the cavity of the airfoil portion; and
   curing the airfoil portion material of the airfoil portion and the first ply so that the first ply forms a tip cap that at least partially closes the first cavity at the tip region and the precursors of the airfoil portion material and the first ply are converted to the ceramic-based materials thereof.

2. The process according to claim 1, wherein the airfoil portion material further contains a reinforcement material in the precursor thereof, and the reinforcement material is contained in a matrix formed by the ceramic-based material of the airfoil portion material as a result of the curing step.

3. The process according to claim 1, wherein the airfoil portion material comprises a plurality of plies, each of the plies contains a reinforcement material in the precursor of the airfoil portion material, and the reinforcement materials of the plies are contained in a matrix formed by the ceramic based material of the airfoil portion material as a result of the curing step.

4. The process according to claim 1, wherein the at least first ply further contains a reinforcement material in the precursor thereof, and the reinforcement material is contained in a matrix formed by the ceramic-based material of the at least first ply as a result of the curing step.

5. The process according to claim 1, further comprising forming a plurality of additional plies that each contains the precursor of the ceramic based material of the at least first ply, and the first cavity at the tip region of the airfoil portion is at least partially closed by the at least first ply and the additional plies.

6. The process according to claim 5, wherein the at least first and additional plies are oriented within the first cavity to lie in chord-wise and span-wise directions of the airfoil portion.

7. The process according to claim 5, wherein the at least first and additional plies are oriented within the cavity to lie in chord-wise and thickness-wise directions of the airfoil portion.

8. The process according to claim 5, wherein the at least first and additional plies define the wedge-shaped profile.

9. The process according to claim 8, further comprising:
   forming a notch in the concave and convex walls of the airfoil portion; and
   inserting the at least first and additional plies in the cavity of the airfoil portion so that the wedge-shaped profile engages the notch in the concave and convex walls;
   wherein the tip cap is interlocked within the first cavity by the interlocking of the wedge shaped profile and the notch.

10. The process according to claim 5, wherein the airfoil portion material comprises a plurality of plies, each of the plies contains a reinforcement material in the precursor of the airfoil portion material, and the reinforcement materials of the plies are contained in a matrix formed by the ceramic based material of the airfoil portion material as a result of the curing step.

11. The process according to claim 10, wherein the at least first ply, the additional plies, and the plies of the airfoil portion are formed by a prepreg process.

12. The process according to claim 5, wherein the at least first ply and additional plies completely close only the first cavity at the tip region of the airfoil portion.

13. The process according to claim 12, further comprising second additional plies that completely close a second cavity at the tip region of the airfoil portion.

14. The process according to claim 12, further comprising second additional plies that are within the first cavity and are a wrapped around the at least first and additional plies within the first cavity.

15. The process according to claim 5, wherein most of the additional plies have roughly equal span wise lengths.

16. The process according to claim 1, further comprising engaging the tip cap and the concave and convex walls of the airfoil portion with at least one pin.

17. The process according to claim 1, further comprising forming holes through the tip cap.

18. The process according to claim 1, wherein the component is a blade or a vane.

19. The process according to claim 1, further comprising forming a notch in the concave and convex walls of the airfoil portion and wherein the wedge-shaped profile engages the notch in the concave and convex walls.

20. The process according to claim 19, wherein the tip cap is interlocked with the airfoil by the interlocking of the wedge shaped profile and the notch.

* * * * *